(12) United States Patent
Kotzer et al.

(10) Patent No.: US 10,382,932 B2
(45) Date of Patent: Aug. 13, 2019

(54) HIGH FREQUENCY COMMUNICATION ALTERNATIVE

(71) Applicant: GM Global Technology Operations LLC, Detroit, MI (US)

(72) Inventors: Igal Kotzer, Tel-Aviv (IL); Ofer Givati, Herzliya (IL); Eilon Riess, Zikron-Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/649,146

(22) Filed: Jul. 13, 2017

(65) Prior Publication Data

US 2019/0020984 A1 Jan. 17, 2019

(51) Int. Cl.
*H04L 29/08* (2006.01)
*H04W 4/90* (2018.01)
*H04W 4/46* (2018.01)
*H04W 84/04* (2009.01)
*H04W 4/80* (2018.01)

(52) U.S. Cl.
CPC ............ *H04W 4/90* (2018.02); *H04W 4/46* (2018.02); *H04L 67/12* (2013.01); *H04W 4/80* (2018.02); *H04W 84/042* (2013.01)

(58) Field of Classification Search
CPC .................................................... H04L 67/12
See application file for complete search history.

(56) References Cited

U.S. PATENT DOCUMENTS

| | | | | |
|---|---|---|---|---|
| 6,728,525 | B1* | 4/2004 | Leizerovich | H04B 1/005 455/127.4 |
| 8,897,394 | B1* | 11/2014 | Nabar | H04L 27/261 375/260 |
| 2010/0232326 | A1* | 9/2010 | Kellerman | H04L 25/24 370/310 |
| 2011/0086678 | A1* | 4/2011 | Suzuki | H04M 1/6091 455/569.2 |
| 2018/0159763 | A1* | 6/2018 | Srinivasan | H04B 7/18506 |

* cited by examiner

*Primary Examiner* — Christopher M Brandt
(74) *Attorney, Agent, or Firm* — Cantor Colburn LLP

(57) ABSTRACT

A system and method to control communication in a vehicle include receiving an input. A controller determines whether to transmit a message using a high frequency (HF) communication system based on the input. The frequency range used by the HF communication system is lower than a frequency range used by the cellular communication system. The method includes controlling transmission by the HF communication system based on determining to transmit the message using the HF communication system.

20 Claims, 4 Drawing Sheets

HIGH FREQUENCY COMMUNICATION ALTERNATIVE

INTRODUCTION

The subject disclosure relates to a high frequency (HF) communication alternative.

Vehicles (automobiles, construction equipment, farm equipment, automated manufacturing equipment) have communication capabilities to communicate with each other using a vehicle-to-vehicle (V2V) scheme or with other entities (e.g., dealerships, service providers) using a vehicle-to-everything (V2X) scheme. Typically, the communication uses cellular frequencies in the ultra high frequency band. However, there can be circumstances in which the cellular infrastructure is unavailable based on the vehicle location or undesirable based on cost, for example. Accordingly, it is desirable to provide an HF communication alternative.

SUMMARY

In one exemplary embodiment, a method of controlling communication in a vehicle includes receiving an input and determining whether to transmit a message using a high frequency (HF) communication system based on the input. The frequency range used by the HF communication system is lower than a frequency range used by the cellular communication system. The method also includes controlling transmission by the HF communication system based on determining to transmit the message using the HF communication system.

In addition to one or more of the features described herein, the receiving the input includes receiving a status of availability of the cellular communication system indicating unavailability or receiving a user input.

In addition to one or more of the features described herein, the receiving the input includes receiving an indication that the message is an emergency message.

In addition to one or more of the features described herein, the controlling the transmission includes specifying one or more carrier frequencies among available carrier frequencies for transmission of the message.

In addition to one or more of the features described herein, the controlling the transmission includes specifying two or more carrier frequencies among the available carrier frequencies for transmission in a round-robin fashion.

In addition to one or more of the features described herein, the controlling the transmission includes specifying two or more carrier frequencies among the available carrier frequencies for transmission in a specified order based on a maximum range associated with each of the two or more carrier frequencies.

In addition to one or more of the features described herein, the controlling the transmission includes specifying a number of times to repeat the transmission using each of the one or more carrier frequencies.

In addition to one or more of the features described herein, a HF message is received using the HF communication system.

In addition to one or more of the features described herein, the HF message is forwarded based on recipient information indicated by the HF message.

In addition to one or more of the features described herein, information is forwarded to a driver of the vehicle based on a content of the HF message.

In another exemplary embodiment, a system to communicate in a vehicle includes a cellular communication system to transmit and receive using cellular frequencies, and a high frequency (HF) communication system to transmit and receive using one or more carrier frequencies that are less than a range of frequencies used by the cellular communication system. The system also includes a controller to receive an input, determine whether to transmit a message using the HF communication system based on the input.

In addition to one or more of the features described herein, the controller determines whether to transmit the message using the HF communication system based on the input indicating unavailability of the cellular communication system or the input indicating a user selection.

In addition to one or more of the features described herein, the controller determines whether to transmit using the HF communication system based on an indication that the message is an emergency message or based on an importance or urgency indicated for the message.

In addition to one or more of the features described herein, the controller controls transmission of the message by specifying one or more carrier frequencies among the one or more carrier frequencies for transmission of the message.

In addition to one or more of the features described herein, the controller controls the transmission of the message by specifying two or more carrier frequencies among the one or more carrier frequencies for transmission in a round-robin fashion.

In addition to one or more of the features described herein, the controller controls the transmission of the message by specifying two or more carrier frequencies among the one or more carrier frequencies for transmission in a specified order based on a maximum range associated with each of the two or more carrier frequencies.

In addition to one or more of the features described herein, the controller controls the transmission of the message by specifying a number of times to repeat the transmission using each of the one or more carrier frequencies.

In addition to one or more of the features described herein, the HF communication system receives a HF message.

In addition to one or more of the features described herein, the controller controls the HF communication system to forward the HF message based on recipient information indicated by the HF message.

In addition to one or more of the features described herein, the controller displays information to a driver of the vehicle based on a content of the HF message.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As previously noted, vehicle communication with other vehicles or other entities is typically performed in the cellular frequency band. Cellular communication relies on a network of base stations that receive and transmit radio waves in the cellular frequency range (typically frequency bands on the order of 700 megahertz (MHz) through 2700 MHz) to relay a message from a sender to the ultimate recipient. When a vehicle is outside the transmission and reception range of any base station, the vehicle cannot communicate via the cellular frequency range. Even when cellular communication is available, it may be undesirable in certain situations. For example, when a vehicle travels outside the network to which it is subscribed and enters an area covered by base stations of a different cellular network, additional charges may be incurred for communication using the other cellular network. Embodiments of the systems and methods detailed herein relate to a HF communication alternative (frequencies on the order of 1.8 MHz to 30 MHz). Transmissions from the vehicle may be automatically or selectively switched to the HF communication system rather than the cellular communication system according to the embodiments detailed herein.

Figure 1:
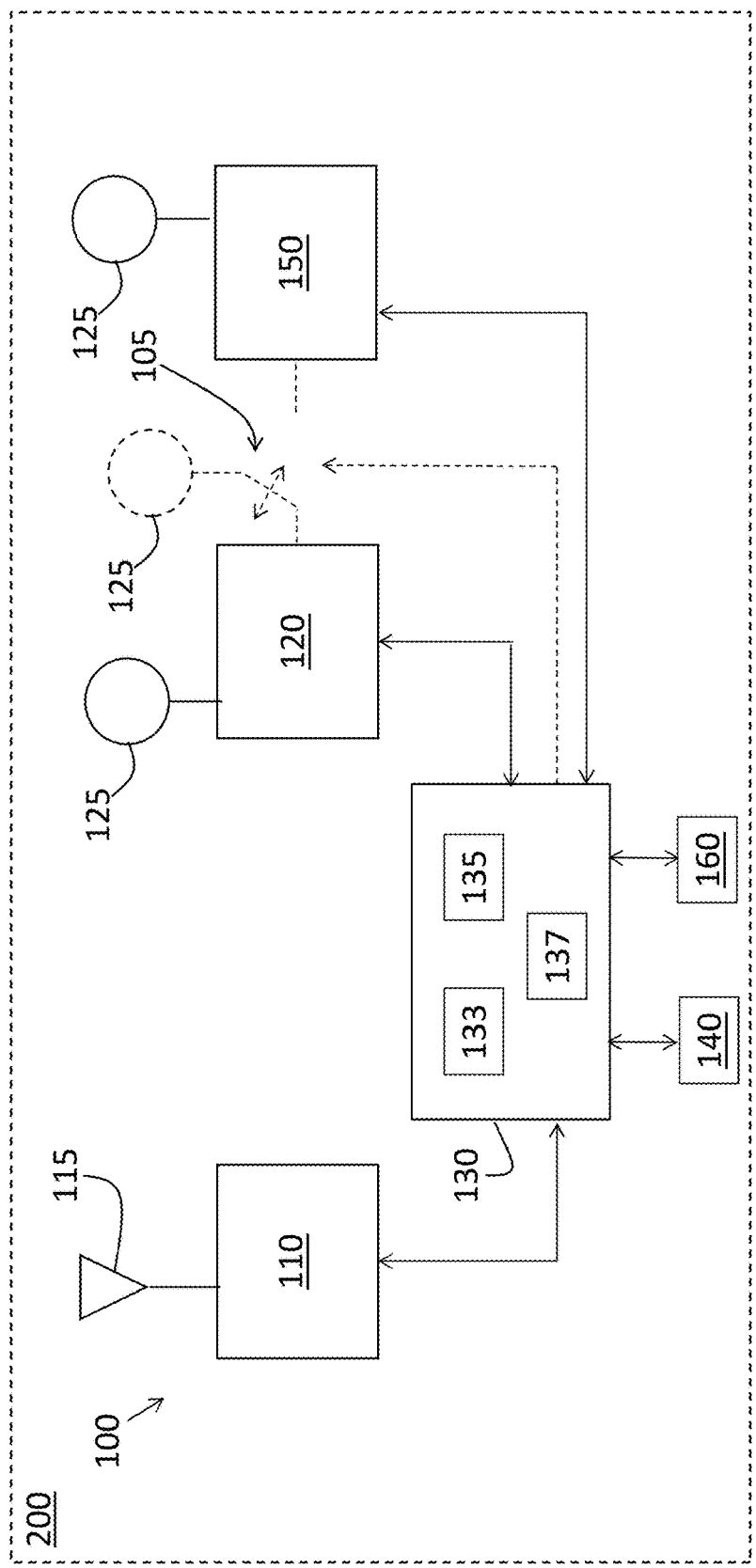
FIG. 1 is a block diagram of the system to facilitate a HF communication alternative according to one or more embodiments.

In accordance with an exemplary embodiment, FIG. 1 is a block diagram of the system 100 to facilitate an HF communication alternative. The system 100 is part of a vehicle 200. A cellular communication system 110 and HF communication system 120 are shown. An infotainment system 150 of the vehicle 100 that includes an amplitude modulation (AM) and frequency modulation (FM) receiver is also shown. The infotainment system 150 may communicate via the cellular communication system 110 (e.g., receive streaming video). The cellular communication system 110 is shown with an antenna 115 but may employ multiple antennas 115 or arrays of antennas 115. The infotainment system 150 and HF communication system 120 may use separate antennas 125 or may share an antenna 125. An exemplary embodiment of the antenna 125 used by the HF communication system 120 is detailed with reference to FIG. 2.

According to the exemplary embodiment indicated in FIG. 1, the HF communication system 120 may share the antenna 125 used by the infotainment system 150 to receive AM/FM signals. The switch 105 controls whether the infotainment system 150 or the HF communication system 120 have access to the antenna 125. In this case, the HF communication system 120 may use the antenna 125 only during transmission and the infotainment system 150 may receive all of the time that the HF communication system 120 is not transmitting. This means that even communication intended for the HF communication system 120 (e.g., broadcast by the HF communication system 120 of another vehicle 100) is received by the infotainment system 150 for relaying or processing. The switch 105 is controlled by a controller 130.

The controller 130 may include an application specific integrated circuit (ASIC), an electronic circuit, a processor (shared, dedicated, or group) 133 and memory 135 that executes one or more software or firmware programs, as shown in the exemplary embodiment, a combinational logic circuit, and/or other suitable components that provide the described functionality. Based on conditions that are further detailed, the controller 130 controls when the HF communication system 120 transmits. When the HF communication system 120 shares the antenna 125 with the infotainment system 150, the controller facilitates transmission by the HF communication system 120 by controlling the switch 105.

Both the cellular communication system 110 and the HF communication system 120 (on its own or through the infotainment system 150) have simultaneous receive capability and receive continuously, periodically, or according to an event-based scheme. In addition to controlling which communication system may transmit at a given time by controlling the switch 105, the controller 130 may control the transmission scheme (e.g., which of one or more frequencies are used for transmission by the HF communication system 120), which is further detailed with reference to FIG. 3. The controller 130 may additionally control the management of messages received by the cellular communication system 110, the infotainment system 150, and the HF communication system 120. The disposition of messages received through the HF communication system 120 (directly or via the infotainment system) is detailed with reference to FIG. 3. According to alternate embodiments, the controller 130 may be part of the infotainment system 150 of the vehicle 200.

The controller 130 includes an interface 137 to communicate with a user interface 140 and other systems 160 of the vehicle 200. The user interface 140 may be part of the infotainment system 150 of the vehicle 200, for example, and facilitates receiving inputs from the user as well as displaying information to the user. The user interface 140 facilitates indicating to the user (e.g., driver) that the vehicle 200 is in an area that is outside the subscribed cellular network and also receiving a selection of the HF communication system 120 by the user. The other systems 160 of the vehicle 200 include all the systems additional to the infotainment system 150 that may generate messages for transmission. For example, a braking system of the vehicle 200 may generate a message under certain braking scenarios. The collision avoidance system or navigation system of the vehicle 200 may also generate messages for transmission, as other examples.

Figure 2:
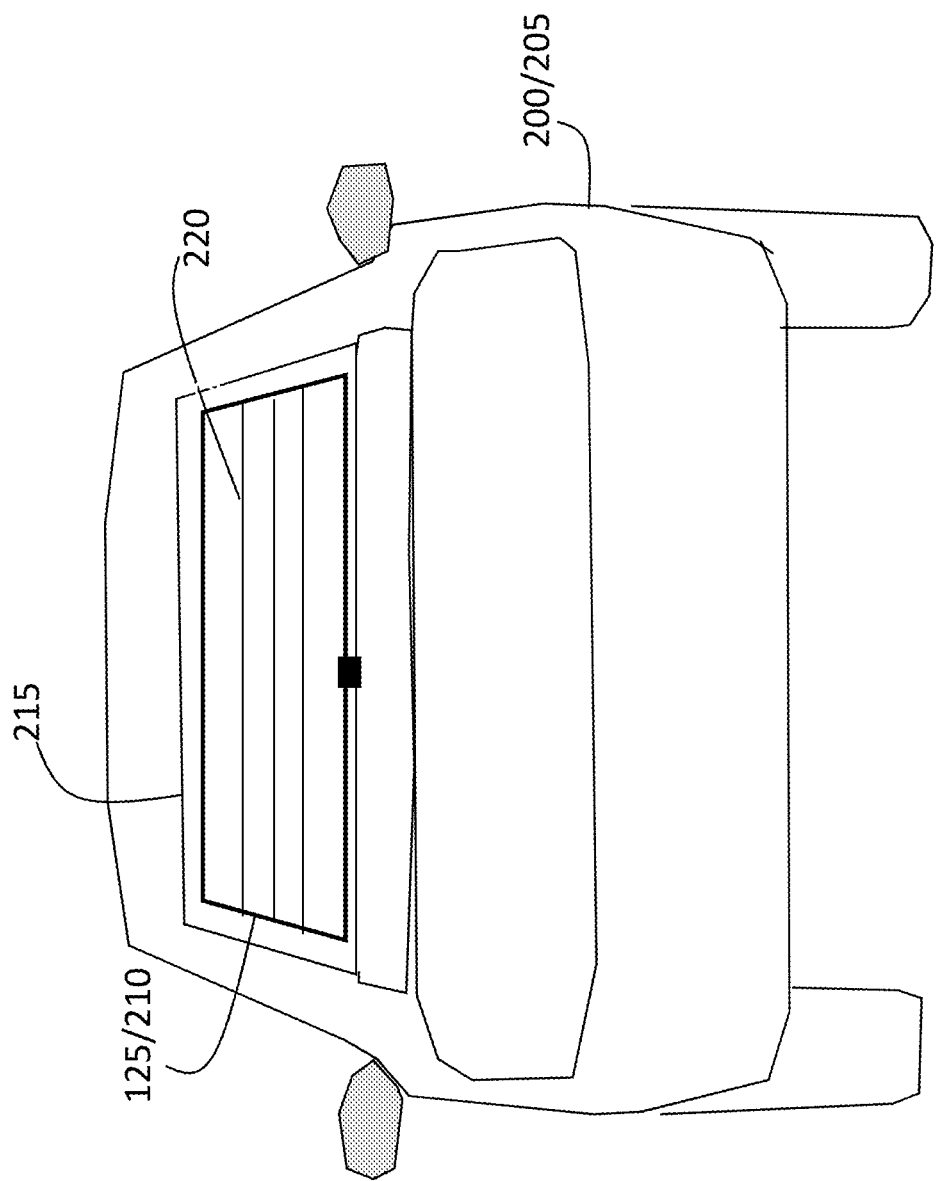
FIG. 2 shows an exemplary antenna of the HF communication system according to one embodiment.

FIG. 2 shows an exemplary antenna 125 of the HF communication system 120 according to one embodiment. The vehicle 200 is an automobile 205 according to the exemplary embodiment shown in FIG. 2. The antenna 125, according to the exemplary embodiment shown in FIG. 2, is a magnetic loop or wire loop antenna 210. The wire loop antenna 210 according to the present embodiment is embedded in the rear window 215 of the automobile 205 along with the conductive defroster grid 220, for example. As noted with reference to FIG. 1, according to one or more embodiments, the antenna 125 may be used to receive amplitude modulation (AM) and frequency modulation (FM) signals as well as transmit the HF signals.

Figure 3:
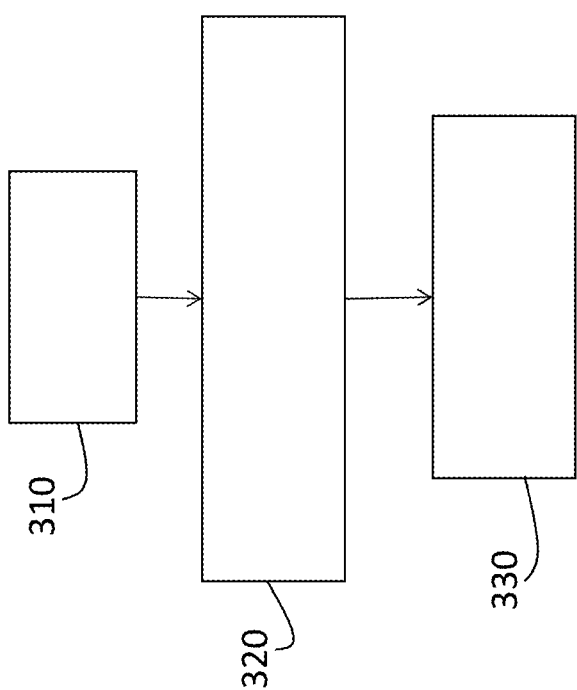
FIG. 3 is a process flow of a method of controlling communication in a vehicle to use a HF communication alternative for transmission according to one or more embodiments.

FIG. 3 is a process flow of a method of controlling communication in a vehicle 200 to use an HF communication, alternatively or additionally, for transmission according to one or more embodiments. At block 310, receiving input refers to the controller 130 receiving input from one of several potential sources. The controller 130 may receive input from a user via the user interface 140 to select the HF communication system 120. The selection may be based on an indication to the user that the currently available cellular network is different than the one the user subscribes to, for example. The controller 130 may receive input from the cellular communication system 110 indicating low or no signal strength for the cellular network. The controller 130 may receive an input that indicates that a message to be transmitted by the vehicle 200 is an emergency message.

Determining the transmission mode, at block 320, refers to the controller 130 determining whether the cellular communication system 110, the HF communication system 120, or both should transmit. The determination may be based on the source and type of input received by the controller 130 at block 310. According to an exemplary embodiment, when the received input (at block 310) indicates that the user selected the HF communication system 120, then the controller 130 may select the HF communication system 120 for transmissions from the vehicle 200 until the user selection changes. When a user selects the HF communication system 120 to be used for transmission, the user may additionally be asked for or may additionally provide an indication of the importance of the message. This importance information may be used to determine the transmission scheme, as discussed with reference to the processing at block 330.

As previously noted, when the controller 130 receives input (at block 310) indicating that the cellular communication system 110 cannot transmit due to the vehicle 200 being out of range of any cellular base stations, for example, the controller 130 may determine (at block 320) that the HF communication system 120 should be used for every transmission. In alternate embodiments, when the cellular communication system 110 is unavailable, only an emergency call (e.g., dialing 911 via the vehicle 200 Bluetooth) or a distress call through the subscription-based vehicle communication system may be transmitted through the HF communication system 120. All non-emergency communication may simply not be sent until the cellular communication system 110 is available again. When the input (at block 310) indicates that the message to be transmitted is an emergency message (e.g., a message requesting medical or other assistance), then the controller 130 may determine transmission by both the cellular communication system 110 and the HF communication system 120 at block 320. The indication that the message is an emergency message may be part of the message itself, as discussed with reference to the processing at block 330.

Additional rules may be used to control the ultimate transmission at block 330. The specific transmission scheme used by the HF communication system 120 may be determined based on the type of message being transmitted or other conditions. HF radio waves propagate via ground waves, which travel parallel to the ground and have a relatively high power decay rate, or sky waves, which propagate via the ionosphere and are bounced back to the ground, thereby providing a contoured coverage area. The specific propagation characteristics of a given HF transmission depend on physical parameters such as the time of day, the carrier frequency, and the season. Thus, the HF communication system 120 may have multiple (e.g., 3-4) carrier frequencies available for transmission. The transmission scheme selected by the controller 130 refers to which one or more carrier frequencies are selected for transmission and, according to some embodiments, the order in which those carrier frequencies are transmitted.

For example, controlling transmission, at block 330, includes the controller 130 controlling the HF communication system 120 to transmit an emergency message with every available carrier frequency according to a circular order referred to as a round-robin scheme. Alternately, the controller 130 may control the HF communication system 120 to transmit the carrier frequencies according to a predefined order. The order may correspond with the range (e.g., closest to farthest) at which each of the carrier frequencies provides the highest signal strength. The controller 130 may control the transmission by each specified frequency to be repeated a specified number of times to increase the probability of reception. The controller 130 may limit the transmission of some types of informational messages to one or more carrier frequencies based on the approximate range at which the signal strength is relatively higher. For example, when a weather emergency is detected in the vicinity of the vehicle 200 by a sensor of the vehicle 200, the controller 130 may specify transmission of an informational message by the HF communication system 120 using only the carrier frequency associated with the closest range. This is because the message would be relevant at a closer range (e.g., 100 miles, corresponding with a carrier frequency around 3 MHz) but irrelevant at a longer range (e.g., 1000 miles, corresponding with a carrier frequency around 14 MHz), for example.

The messages transmitted via the HF communication system 120 may be encrypted such that only intended recipients (e.g., other vehicles 200, a subscription service provider, dealer network) can read the message contents. The encryption may be necessary because the carrier frequencies used by the HF communication system 120 are reused for other purposes. Known encryption techniques may be used to generate the messages. Each message may include address information to indicate the intended ultimate recipient. The message may additionally include GPS location information of the sending vehicle 200, and an indication of the priority of the message (e.g., an indication that the message is an emergency message or an important or urgent message).

Figure 4:
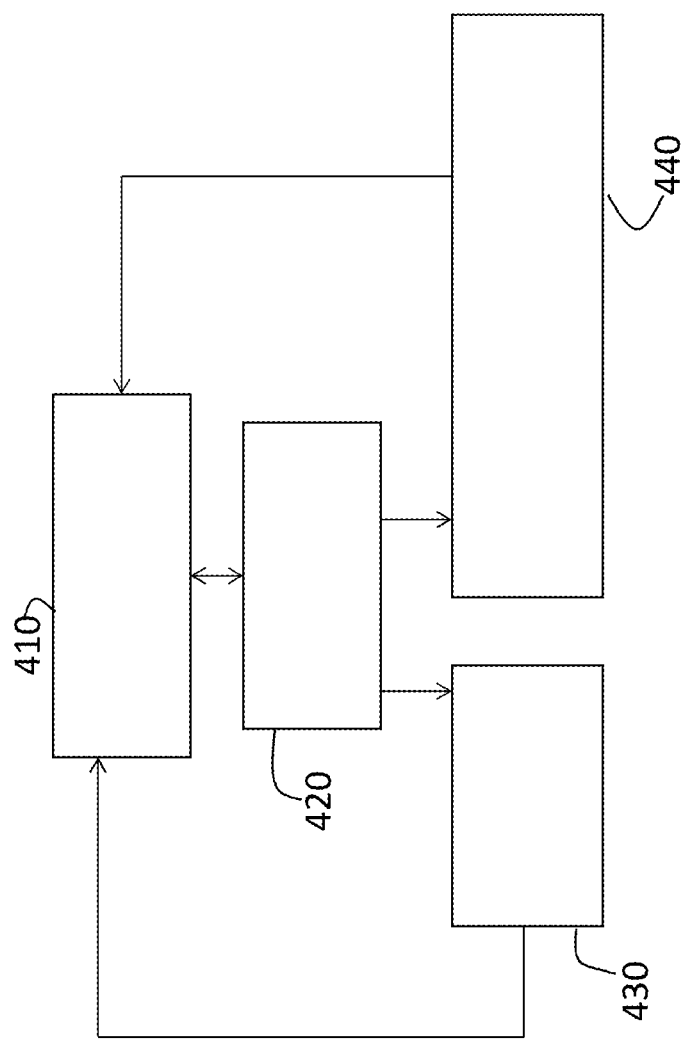
FIG. 4 is a process flow of a method of controlling communication in a vehicle to manage messages received through a HF communication alternative according to one or more embodiments.

FIG. 4 is a process flow of a method of controlling communication in a vehicle 200 to manage messages received through a HF communication alternative according to one or more embodiments. At block 410, monitoring frequencies refers to tuning the antenna 125, in turn, to each carrier frequency (among the set of carrier frequencies used by the HF communication system 120) and determining whether a message has been received. This process continues until a message is received. Decrypting a received message, at block 420, is an optional process based on whether encryption of transmitted messages is used by the HF communication system 120. This decryption process may include demodulating the messages first if messages transmitted by the HF communication system 120 are modulated (e.g., AM, FM, quadrature amplitude modulation (QAM)). If the message cannot be decrypted, then the message is determined not to be part of the communication of the HF communication system 120, and monitoring is resumed at block 410.

When a received message is properly decrypted, at block 420, then one or both of the processes at blocks 430 and 440 is performed, and the process (at block 410) of monitoring frequencies resumes. At block 430, relaying the message refers to re-transmitting the message. This process is performed when the decryption indicates that the vehicle 200 receiving the message is not the intended ultimate recipient. The re-transmission may be according to one of the schemes discussed with reference to FIG. 3 (e.g., transmission using each of the carrier frequencies in a round-robin fashion). The re-transmission may also be done for an informational message that should continue to be propagated.

At block 440, performing an action based on the message includes taking shelter based on an emergency message. For example, a subscription-based provider may broadcast a message regarding a tornado warning to vehicles 200 in an affected area. In this case, the controller 130 may display the message to the driver upon receiving and decrypting the message. This message may be one that is re-transmitted (at block 430), as well. The message may be intended for an occupant of the vehicle 200 that received the message. In this case, the controller 130 may display the message or play a voicemail included within the message in the vehicle 200.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling communication in a vehicle, the method comprising:
    receiving an input;
    determining, using a processor and based on the input, whether to transmit a message using an available high frequency (HF) communication system rather than an available cellular communication system, wherein a frequency range used by the HF communication system is in a megahertz range and is lower than a frequency range used by the cellular communication system; and
    controlling transmission by the HF communication system based on determining to transmit the message using the HF communication system.

2. The method according to claim 1, wherein the receiving the input includes receiving a status of availability of the cellular communication system indicating unavailability or receiving a user input.

3. The method according to claim 1, wherein the receiving the input includes receiving an indication that the message is an emergency message.

4. The method according to claim 1, wherein the controlling the transmission includes specifying one or more carrier frequencies among available carrier frequencies for transmission of the message.

5. The method according to claim 4, wherein the controlling the transmission includes specifying two or more carrier frequencies among the available carrier frequencies for transmission in a round-robin fashion.

6. The method according to claim 4, wherein the controlling the transmission includes specifying two or more carrier frequencies among the available carrier frequencies for transmission in a specified order based on a maximum range associated with each of the two or more carrier frequencies.

7. The method according to claim 4, wherein the specifying a number of times to repeat the transmission includes specifying the number of times to repeat the transmission using each of the one or more carrier frequencies.

8. The method according to claim 1, further comprising receiving a HF message using the HF communication system.

9. The method according to claim 8, further comprising forwarding the HF message based on recipient information indicated by the HF message.

10. The method according to claim 8, further comprising displaying information to a driver of the vehicle based on a content of the HF message.

11. A system to communicate in a vehicle, the system comprising:
    a cellular communication system configured to transmit and receive using cellular frequencies;
    a high frequency (HF) communication system configured to transmit and receive using one or more carrier frequencies that are in a megahertz range and less than a range of frequencies used by the cellular communication system; and
    a controller configured to receive an input and to determine, based on the input, whether to transmit a message using the HF communication system rather than the cellular communication system.

12. The system according to claim 11, wherein the controller is further configured to determine whether to transmit the message using the HF communication system based on the input indicating unavailability of the cellular communication system or the input indicating a user selection.

13. The system according to claim 11, wherein the controller is further configured to determine whether to transmit using the HF communication system based on an indication that the message is an emergency message or based on an importance or urgency indicated for the message.

14. The system according to claim 11, wherein the controller is further configured to control transmission of the message by specifying one or more carrier frequencies among the one or more carrier frequencies for transmission of the message.

15. The system according to claim 14, wherein the controller is further configured to control the transmission of the message by specifying two or more carrier frequencies among the one or more carrier frequencies for transmission in a round-robin fashion.

16. The system according to claim 14, wherein the controller is further configured to control the transmission of the message by specifying two or more carrier frequencies for transmission in a specified order based on a maximum range associated with each of the two or more carrier frequencies.

17. The system according to claim 14, wherein the controller specifies a number of times to repeat the transmission using each of the one or more carrier frequencies.

18. The system according to claim 11, wherein the HF communication system receives a HF message.

19. The system according to claim 18, wherein the controller is further configured to control the HF communication system to forward the HF message based on recipient information indicated by the HF message.

20. The system according to claim 18, wherein the controller is further configured to display information to a driver of the vehicle based on a content of the HF message.

* * * * *